INVENTORS
Arthur M. Wickwire
and Hans J. Zimmermann
BY Frease and Bisley
ATTORNEYS May 8, 1951 A. M. WICKWIRE ET AL 2,551,918
CENTRIFUGAL FLUID PRESSURE OPERATED CLUTCH
Filed April 6, 1946 6 Sheets-Sheet 3

INVENTORS
Arthur M. Wickwire
and Hans J. Zimmermann
BY Freast and Bishop
ATTORNEYS INVENTORS
Arthur M. Wickwire
and Hans J. Zimmermann
BY Frease and Bishop
ATTORNEYS

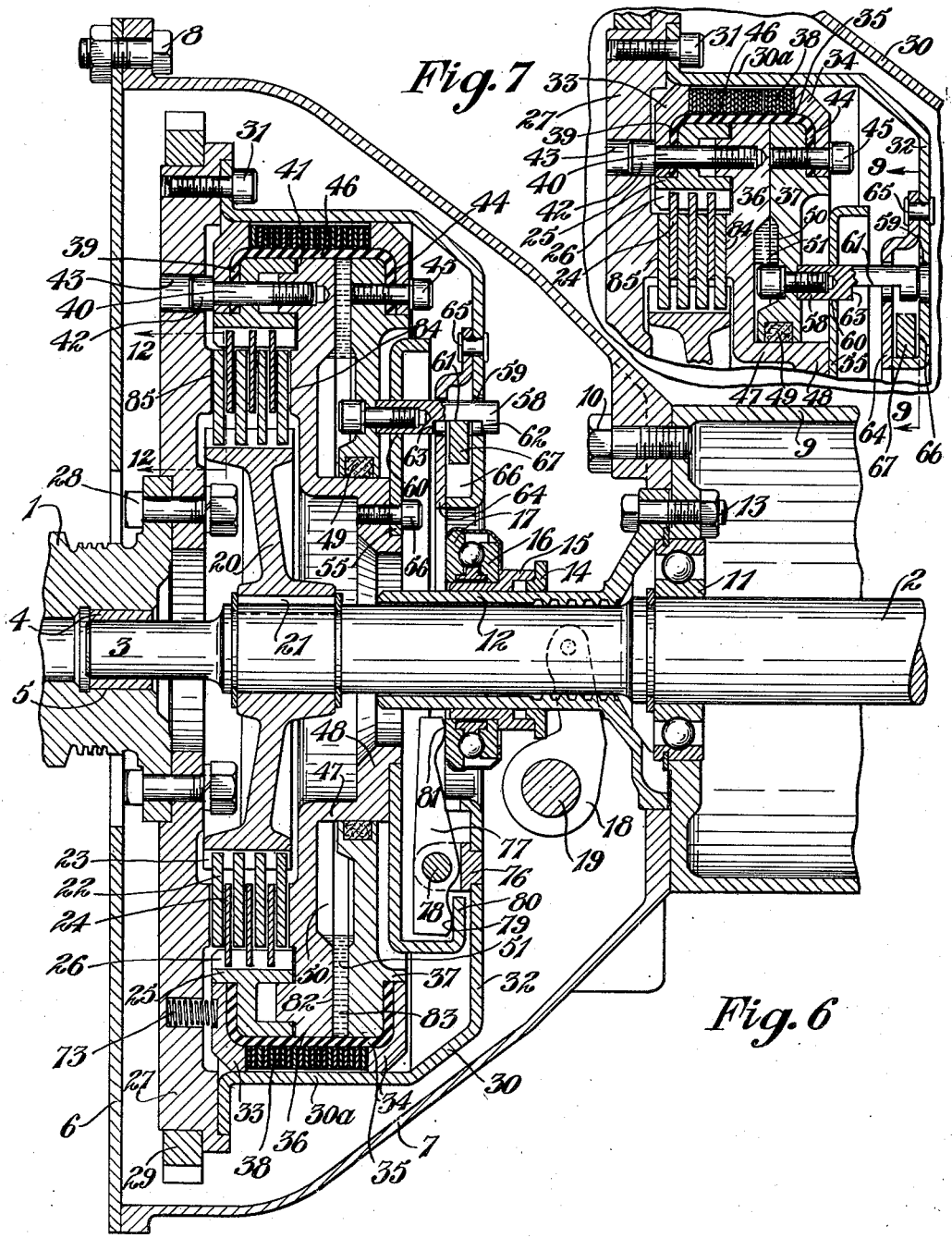

Patented May 8, 1951

2,551,918

UNITED STATES PATENT OFFICE 2,551,918

CENTRIFUGAL FLUID PRESSURE OPERATED CLUTCH

Arthur M. Wickwire, Mountain Lakes, N. J., and Hans J. Zimmermann, Canton, Ohio, assignors, by mesne assignments, to Automatic Steel Products, Inc., a corporation of Delaware Application April 6, 1946, Serial No. 660,251

7 Claims. (Cl. 192—105)

The invention relates to clutches and more particularly to an automotive clutch which operates automatically and which has an auxiliary manual control; and also to a liquid, preferably mercury, actuated clutch having selective manual or automatic control of clutch engagement and disengagement while either or both of the driving and driven members are either stationary or rotating.

There are many uses for a clutch which is normally disengaged when the driving and driven members are at rest, and which automatically engages when the driving member attains a predetermined speed of rotation, which may be manually disengaged and reengaged at any speed above said speed of automatic engagement, and which may be engaged when the driving or driven members or both are at rest.

Particularly in the automotive field there is a demand for a clutch which will automatically engage above motor idling speed, which may be manually disengaged or reengaged by depressing or releasing a usual clutch pedal when the car is running and the clutch automatically engaged, which may be engaged or disengaged in a normal manner by operation of the foot pedal when the car is stopped and the clutch normally automatically disengaged so as to permit the motor to be started by pushing the car, which may be engaged while the car is running above automatic engaging speed but while the motor is idling so as to use the motor as a brake for the car, and which will permit "free wheeling" operation of the car.

The construction of an automatic clutch satisfying these requirements presents a number of complications and difficulties because ordinarily an automatic clutch is not adapted for manual operation during all conditions of rotation or stoppage of either or both of the driving and driven members, and because ordinarily an automatic clutch is disengaged when at rest and it is difficult to provide for manual engagement or disengagement thereof without starting the driving member or motor.

We have discovered a fluid actuated centrifugal clutch construction which may be operated in any of the described manners and which avoids the difficulties, solves the problems, eliminates the complications, and satisfies the demand presented.

Fundamentally, the improved clutch construction utilizes two clutch members for actuating usual clutch friction plates into or out of engagement, which two clutch members are relatively movable and have three primary positions: a first position in which centrifugally developed liquid pressure acting on one or both of the two clutch members causes the clutch members to actuate the friction plates into engagement at above a certain predetermined speed of the driving member and causes disengagement of the clutch friction plates when the speed of the driving member is reduced to said predetermined speed; a second position in which the two clutch members are moved to a location which results in disengagement of the clutch friction plate whether or not the two clutch members are at rest or are rotating and centrifugally developed liquid pressure is acting which would normally cause clutch engagement; and a third position in which the two clutch members are located so as to directly establish engagement of the clutch friction plates.

Likewise, the improved clutch construction fundamentally involves the use of two relatively movable clutch members mounted as a unit, which unit may be moved to one position providing clutch disengagement under all conditions, which unit may be moved to another position providing clutch engagement under all conditions, and which unit has a third position or condition in which relative movement between two members thereof controlled by centrifugally developed liquid pressure acts to automatically engage or disengage the clutch.

Accordingly, it is a primary object of the present invention to provide an automatic clutch with an auxiliary manual control.

Furthermore, it is an object of the present invention to provide a new automotive clutch construction which is automatic but capable of engagement at any time at the option of the driver.

Also, it is an object of the present invention to provide a new automatic automotive clutch construction which may be engaged when the car is at rest and the battery dead so that the motor may be started by pushing the car.

Also, it is an object of the present invention to provide a new automatic automotive clutch which enables the car to "free wheel" with the motor entirely disconnected from the transmission but which avoids the past dangers of using "free wheeling" because engagement of the clutch can be accomplished at any time by accelerating the motor.

Also, it is an object of the present invention to provide a new automatic automotive clutch which enables the motor to be used as a brake for the car, at the option of the driver.

Furthermore, it is an object of the present invention to provide a liquid actuated centrifugal clutch constructed and arranged to satisfy each and all of the foregoing objectives.

Likewise, it is an object of the present invention to provide a liquid actuated centrifugal clutch having two associated clutch members which actuate clutch friction plates into engaged or disengaged positions, which are movable, and which two clutch members have three conditions of relative association, one providing for clutch engagement under all circumstances, another providing for clutch disengagement under all circumstances, and a third providing for automatic clutch engagement or disengagement depending upon the speed of the clutch driving member.

Also, it is an object of the present invention to provide a new liquid actuated centrifugal clutch in which mercury is used as the actuating liquid and in which mercury pressure beyond a certain amount cannot be built up in the mercury-containing compartment even though the clutch may be rotating at high speed which would normally develop tremendous pressure in the mercury-containing compartment.

Finally, it is an object of the present invention to provide a selective automatic and manually controlled engaging and disengaging mercury clutch which is relatively simple in construction, durable and effective in operation, easy to repair, and which utilizes the foregoing discoveries and principles.

These and other objects and advantages apparent to those skilled in the art from the following description and claims may be obtained, the stated results achieved, and the described difficulties overcome, by the devices, constructions, arrangements, combinations, sub-combinations, parts, elements, discoveries and principles which comprise the present invention, the nature of which is set forth in the following general statement, a preferred embodiment of which—illustrative of the best mode in which applicants have contemplated applying the principles—is set forth in the following description and shown in the drawings, and which are particularly and distinctly pointed out and set forth in the appended claims forming part hereof.

The nature of the improvements of the present invention may be stated in general terms as preferably including in a centrifugal, liquid actuated, preferably mercury clutch, a driving member preferably including a fly wheel; a driven member preferably coaxial with the driving member; driving and driven friction disc means; a clutch housing mounted on the fly wheel for rotation therewith; a clutch actuating unit within the housing mounted for movement preferably axially of the driving and driven members and the friction disc means; delayed engagement spring means interposed between the fly wheel and unit; said unit preferably including clamping ring means, a spline ring, an inner plate, a cushion plate, a flexible U-shaped gland, and gland sustaining means; means cooperating between the unit and fly wheel for rotating the unit with the driving member; said inner and cushion plates forming with said gland an annular liquid, preferably mercury, containing compartment; said inner and cushion plates each being axially movable relative to the friction disc means and to each other; spring means reacting between the cushion plate and housing tending to urge said unit toward the friction disc means to establish driving engagement therebetween; latch bolts carried by the cushion plate; preferably centrifugally actuated latch means mounted on the housing normally engaging said latch bolts to normally prevent axial movement of said cushion plate toward the friction disc means by the action of said last mentioned spring means and permitting movement of said cushion plate away from the friction disc means against the action of said spring means; and foot pedal actuated means preferably mounted on said housing for moving said unit or parts thereof away from said friction disc means to disengage the clutch.

By way of example, a preferred embodiment of the improved clutch construction is illustrated in the accompanying drawings forming part hereof, wherein:

Fig. 6 is a view similar to Figs. 1, 4 and 5 but illustrating the clutch parts moved to disengaged position by foot pedal operation;

Fig. 7 is a fragmentary view similar to a portion of Figs. 1, 4, 5 or 6 but showing the clutch parts moved by foot pedal operation to engaged position;

Fig. 10 is a fragmentary section taken on the line 10—10, Fig. 1;

Similar numerals refer to similar parts throughout the various figures of the drawings.

Figure 1:
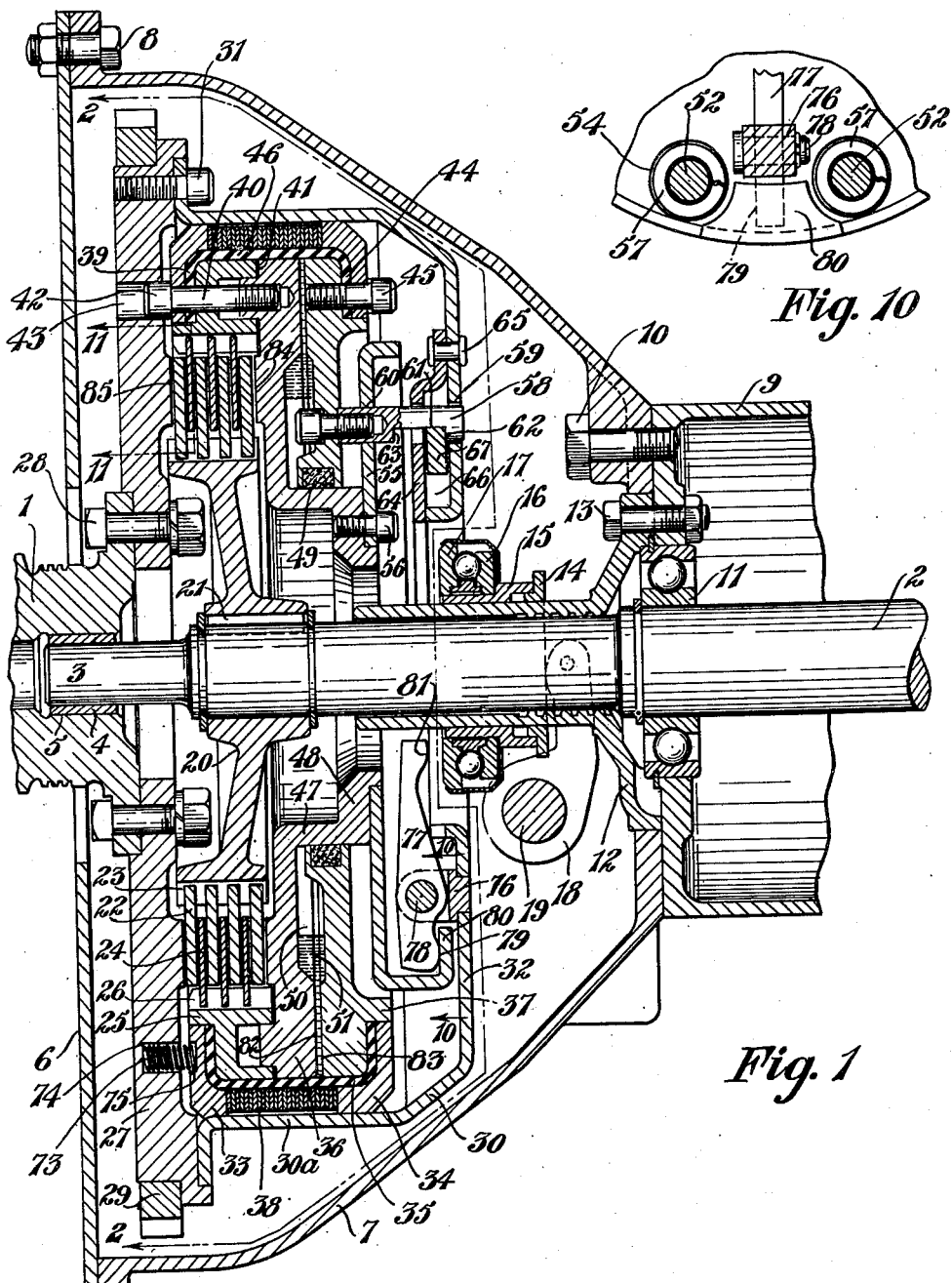
Figure 1 is an axial section taken on the line 1—1, Fig. 2, illustrating the improved clutch construction interposed between the crank shaft and drive shaft of an automobile with the motor idling and the clutch parts in condition for automatic operation.

An automotive clutch incorporating the improvements of the present invention is illustrated in the drawings but it is understood that the principles and improvements of the invention may be utilized in clutch applications other than automotive clutches and that invention is not limited to an automotive clutch.

The clutch driving member is indicated at 1 and may be a crank shaft of the motor of an automobile, truck or the like; and the driven member is indicated at 2 and may be a shaft leading to the transmission of the vehicle. The forward end 3 of shaft 2 may be journaled in a bearing 4 in a central bore 5 at the rear end of crank shaft 1.

The member or plate 6 is a member fixed to the vehicle and may be attached to the crank case, not shown. A bell housing 7 is secured to member 6 by any suitable means such as bolts 8. A housing member 9 preferably is secured as by bolts 10 to one end of the bell housing 7; and a bearing 11 may be mounted in housing 9 journaling the vehicle driving shaft 2.

A stationary sleeve 12, bolted to housing 9 at 13, is located within the bell housing 7, and the drive shaft 2 extends through said sleeve 12. A hardened ring 14 and a throw-out sleeve 15 are slidably mounted on sleeve 12; and a throw-out bearing 16 is mounted on sleeve 15 so that the race member 17 thereof can rotate with respect to the sleeves 12 and 15. A forked bell crank operator lever 18 is pivotally mounted on shaft 19 which may be rotated in the usual manner by movement of a clutch pedal, not shown. When the clutch pedal is released, the ring 14, sleeve 15 and throw-out bearing 16 may be in any one of the positions illustrated in Figs. 1, 4 or 5; and when the clutch pedal is depressed, the lever 18 engaging ring 14 moves the ring 14, sleeve 15 and throw-out bearing 16 to the position shown in Fig. 6.

Figure 11:
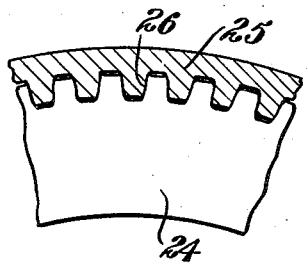
Fig. 11 is a fragmentary view looking in the direction of the arrows 11—11, Fig. 1, showing the spline drive for the driving friction discs.
Figure 12:
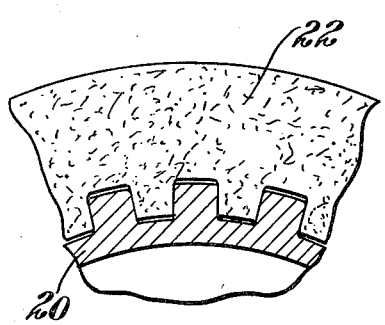
Fig. 12 is a view similar to Fig. 11 taken on the line 12—12, Fig. 6, showing the spline drive for the driven friction discs.

A driven member inner spline hub 20 is mounted, preferably by being keyed at 21, on the driven member 2; and a series of friction discs 22, preferably sintered metal discs or plates, have a spline driving connection 23 with the inner spline hub 20 (Figs. 1, 6 and 12). Intermediate friction discs 24, such as steel rings, are interposed between adjacent sintered discs 22. Intermediate rings 24 are splined to outer spline ring 25 by spline drive 26 (Figs. 1 and 11); and outer spline ring 25 is rotated by the driving member in a manner to be later described.

Ordinarily, an automotive clutch consists essentially of the parts thus far described and the clutch is engaged or disengaged by movement of the vehicle clutch foot pedal to provide or release clamping pressure between the friction discs 22 and 24.

In accordance with the present invention, the usual fly wheel 27 secured at 28 to the rear end of crank shaft 1 and preferably having a starter ring gear 29 mounted thereon, carries a clutch housing 30 secured thereto as by bolts 31. The clutch housing 30 preferably is provided with an annular wall 30a and a side wall 32; and a clutch actuating means or unit is mounted for movement within the housing 30.

The clutch actuating means preferably includes clamping rings 33 and 34, the outer spline ring 25, a U-shaped annular rubber gland 35, an inner pressure plate 36, a release or cushion plate 37 and gland sustaining rings 38.

The clamping ring 33, one leg 39 of gland 35, the outer spline ring 25 and the inner pressure plate 36 are clamped together by bolts 40 to provide a clamped liquid-tight joint between the clamping ring 33, gland leg 39 and spline ring 25. A similar liquid-tight joint is formed by gasket means 41 between the spline ring 25 and inner pressure plate 36. The heads 42 of bolts 40 project from the clutch actuating means into apertures 43 formed in the fly wheel 27 whereby the clutch actuating means is rotated or driven by the driving member 1, while permitting the clutch actuating unit to move axially toward and away from the fly wheel 27. This driving connection 42—43 through bolts 40 which are connected with outer spline ring 25 also drives or rotates the intermediate friction discs 24 with the driving member 1.

The clamping ring 34, the other gland leg 44, and cushion plate 37 are clamped together by bolts 45 to provide a liquid-tight joint for the gland leg 44; and the gland sustaining rings 38 surround the cylindrical annular gland wall 46 and are located between clamping rings 33 and 34 for a purpose to be later described.

The outer annular surfaces of clamping rings 33 and 34 are slidable within the annular wall 30a of the clutch housing 30 so that the clutch actuating unit may slide or move axially in either direction within the clutch housing 30. The inner pressure plate 36 is formed with an inner hub-like flange 47 terminating in an inturned flange 48, upon which flange 47 the cushion plate 37 is slidably mounted. Packing means 49 preferably carried by the cushion plate 37 seals the slidable joint between the inner pressure plate 36 and cushion plate 37. Thus, by axial elongation of the annular gland wall 46, the cushion plate 37 may move axially with respect to the inner pressure plate 36.

The gland 35, inner pressure plate 36 and cushion plate 37 form an annular compartment 50 in which a body of liquid, preferably mercury 51, is contained.

Figure 2:
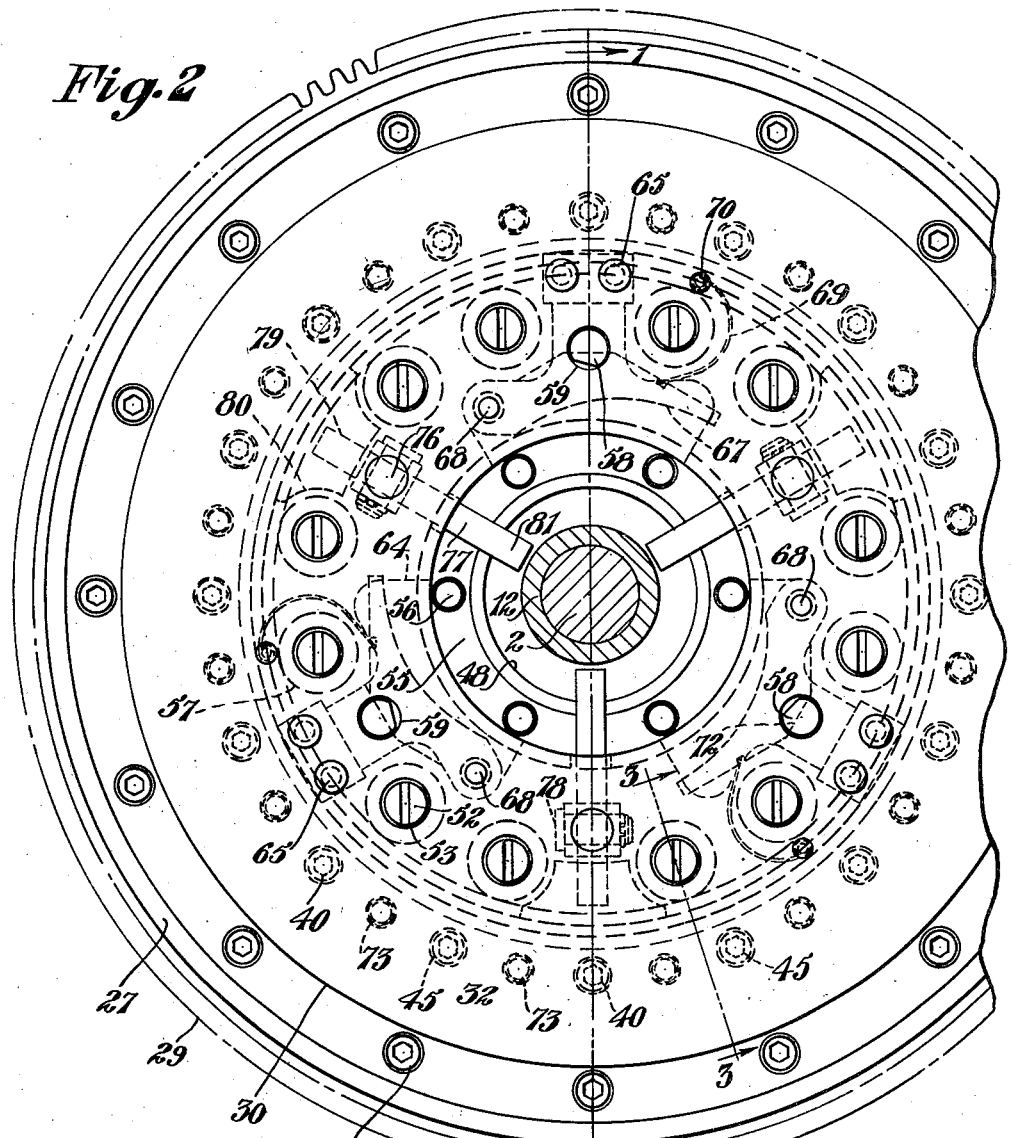
Fig. 2 is a section illustrating the improved clutch construction looking in the direction of the arrows 2—2, Fig. 1.
Figure 3:
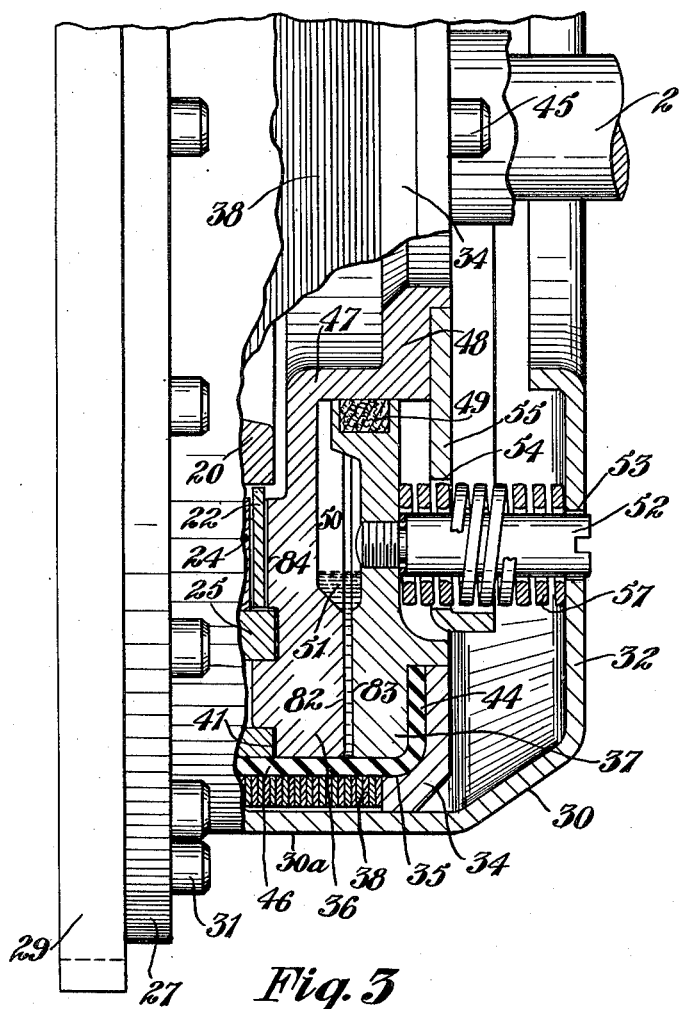
Fig. 3 is an enlarged fragmentary view of a portion of the improved clutch construction showing certain parts in section as on the line 3—3, Fig. 2.

Referring to Figs. 1, 2 and 3, a series of pins 52 are mounted on the cushion plate 37 projecting outwardly therefrom and extending through apertures 53 formed in the side wall 32 of the clutch housing 30, and also extending through a series of apertures 54 formed in a flanged plate 55, secured to the inturned flange 48 of the inner pressure plate 36, by bolts 56. Spring means, preferably coil springs 57 (Fig. 3), are mounted on the pins 52 reacting between the cushion plate 37 and the side wall 32 of the clutch housing 30, normally pressing the cushion plate 37 toward the left (viewing Fig. 1); and also pressing the clutch actuating means or unit toward the left unless such movement is stopped in a manner to be later described.

A series of latch pins 58 are mounted on the cushion plate 37 projecting through other apertures 59 in the side wall 32 of the clutch housing 30 and through apertures 60 in the plate 55. Each latch pin 58 is cut-out at 61 to form an outer shoulder 62 and an inner shoulder 63. A latch plate 64 is mounted by rivet means 65 on the interior of clutch housing side wall 32 adjacent each aperture 59; and the latch plates 64 form with the clutch housing side wall 32 several latch compartments 66.

Figure 8:
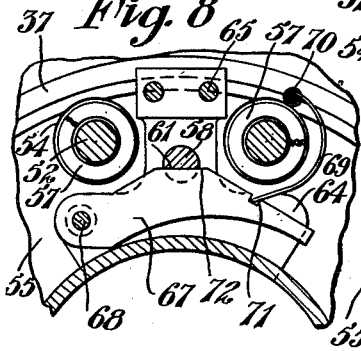
Fig. 8 is a side fragmentary section taken on the line 8—8, Fig. 4, illustrating a cushion plate latch in latched position.
Figure 9:
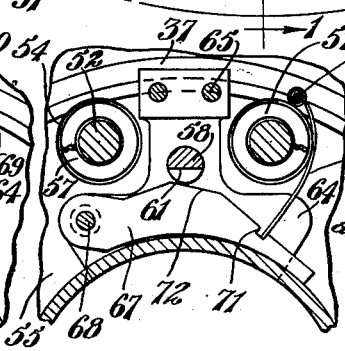
Fig. 9 is a view similar to Fig. 8 but taken on the line 9—9, Fig. 7, showing a latch in unlatched position.

Referring to Figs. 1, 2, 8 and 9, a latch lever 67 is pivotally mounted at 68 on latch plates 64 and housing side wall 32 in each compartment 66, movable between the two positions illustrated in Figs. 8 and 9. Leaf springs 69 mounted at 70 on clutch housing side plate 32 engage latch levers 67, at 71, to normally move the latch levers to the position illustrated in Fig. 9 wherein the stop portion 72 of each latch lever 67 is free of cut-outs 61 in latch pins 58 and cannot engage shoulders 62 and 63. However, when latch levers 67 are in the position shown in Fig. 8, the stop portions 72 thereof may engage either shoulder 62 or 63 of latch pins 58. When the driving member 1 is rotating, the clutch housing 30 rotates therewith and latch levers 67 are thrown outwardly by centrifugal force to the position illustrated in Figs. 1, 2 and 8.

Referring to Fig. 1, another series of springs 73 are mounted in recesses 74 in the fly-wheel 27 and in similar recesses 75 in the clamping ring 33; and the springs 73 react between the fly-wheel 27 and clamping ring 33 (and therefore the clutch actuating unit) to provide for delayed engagement of the clutch.

A series of trunnions 76 are mounted (Figs. 1 and 10) on the clutch housing side wall 32 and clutch disengaging levers 77 are pivoted at 78 on the trunnions 76. The outer ends 79 of the levers 77 are adapted to engage inturned ears 80 on plate 55 attached to inner pressure plate 36; and the inner ends 81 of the disengaging levers 77 are adapted to be engaged by the rotatable member 17 of throw-out bearing 16.

Referring to Fig. 1, the various parts of the clutch are shown in condition for automatic operation and in the position which they normally assume when the clutch is at rest as when the vehicle motor is stopped, or when the motor is rotating at idling speed and the clutch parts are rotating at idling speed therewith. It is further assumed for the sake of description that the idling speed may be any speed up to say 500 R. P. M. for the crank shaft 1. When the clutch parts are in condition for automatic operation in the positions shown in Fig. 1, the latches 67 are in the "out" positions of Fig. 8 engaged by shoulders 62, which engagement is maintained by the pressure of springs 57 (Figs. 2, 3, 8, 9 and 10) even though the clutch parts may be at rest. Thus, the springs 57 hold the latches 67 in latching position and the pins 58 when so latched prevent movement of the cushion plate 37 to the left beyond the position shown in Fig. 1.

At the same time, the delayed engagement springs 73, which are weaker than the springs 57, press other parts of the clutch actuating unit including clamping ring 33, outer spline ring 25 and inner pressure plate 36 toward the right until the wall 82 of the inner pressure plate 36 is closely adjacent the wall 83 of the cushion plate 37 and until the retaining rings 38 are in surface engagement with each other and with the clamping rings 33 and 34. Under these conditions, further movement of the parts of the clutch actuating unit to the right is arrested by the over-powering pressure of springs 57.

Likewise, under these conditions, there is no pressure acting between the friction surface 84 on the inner pressure plate 36 and the friction surface 85 on the fly-wheel 27 tending to press the clutch friction discs 22 and 24 into frictional engagement. Therefore, the clutch is in a condition of automatic disengagement in Fig. 1.

Assuming further that the motor is started and crank shaft 1 commences to rotate, as its speed of rotation increases, the clutch pressure and cushion plates 36 and 37, and the rubber gland 35, rotate therewith. The body of mercury 51, in annular compartment 50, is thrown outward by centrifugal force to the position shown in Fig. 1 and the pressure of the mercury reacts to tend to move the pressure plate 36 and cushion plate 37 apart. However, this mercury pressure is resisted, when the motor is running at idling speed, by relief springs 57 and delayed engagement springs 73. At such time, the motor is idling but the clutch is disengaged, permitting the vehicle transmission to be actuated for changing speeds. All that is necessary to engage the clutch automatically is to accelerate the engine speed to above idling speed.

When the crank shaft 1 rotates at above 500 R. P. M., the pressure of the mercury 51 in compartment 50 becomes greater than the pressure of delayed engagement springs 73 as a result of which, the inner pressure plate 36 and related parts of the clutch actuating unit are moved to the left by the centrifugally developed mercury pressure. This movement presses friction discs 24 and 22 toward each other and establishes full friction driving engagement between the driving and driven friction discs 24 and 22 and the friction surfaces 84 and 85 at say 750 R. P. M. of the crank shaft 1, thereby establishing driving connection between the crank shaft 1 and drive shaft 2.

Figure 4:
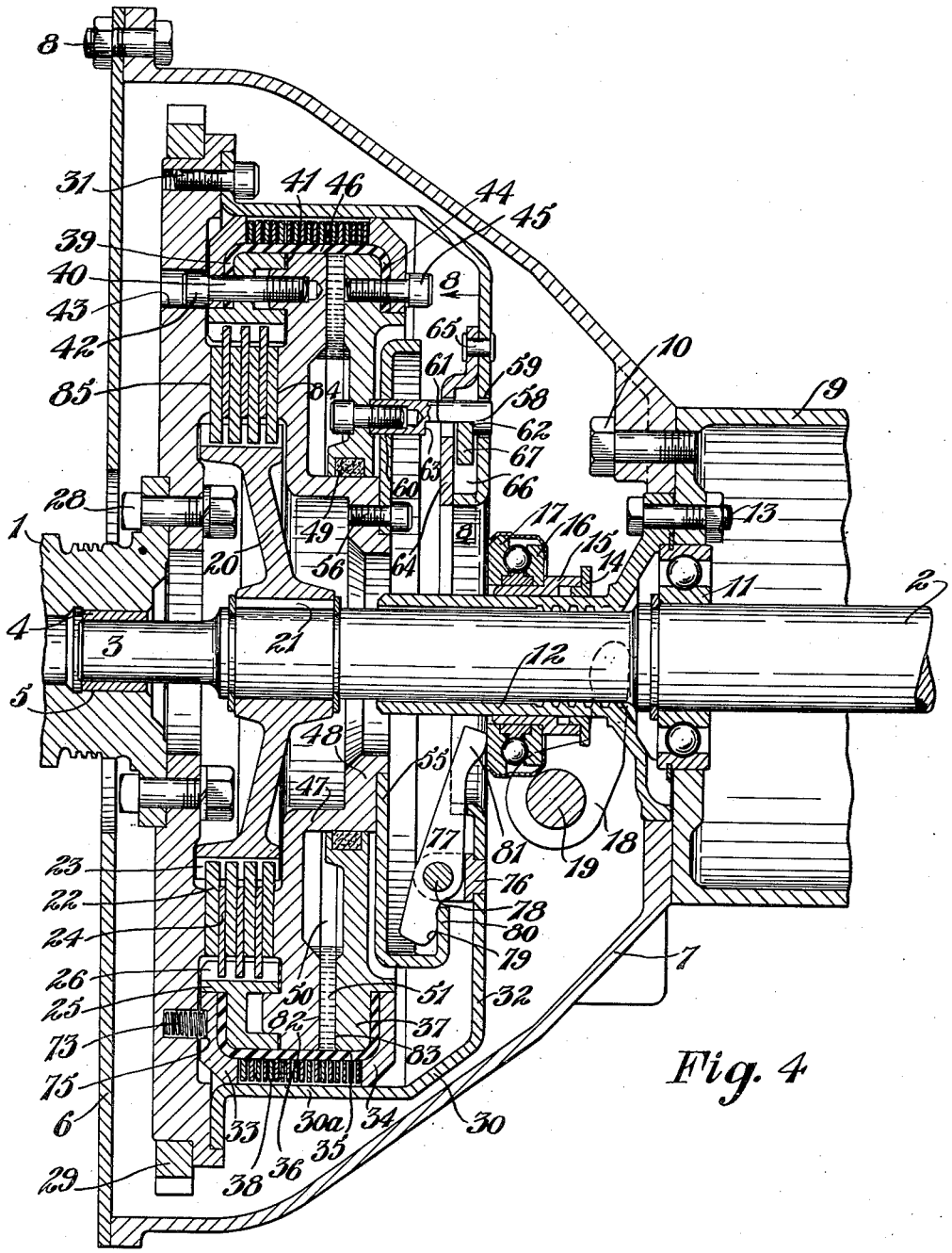
Fig. 4 is a view similar to Fig. 1 but showing the clutch parts in engaged position as a result of automatic operation.
Figure 5:
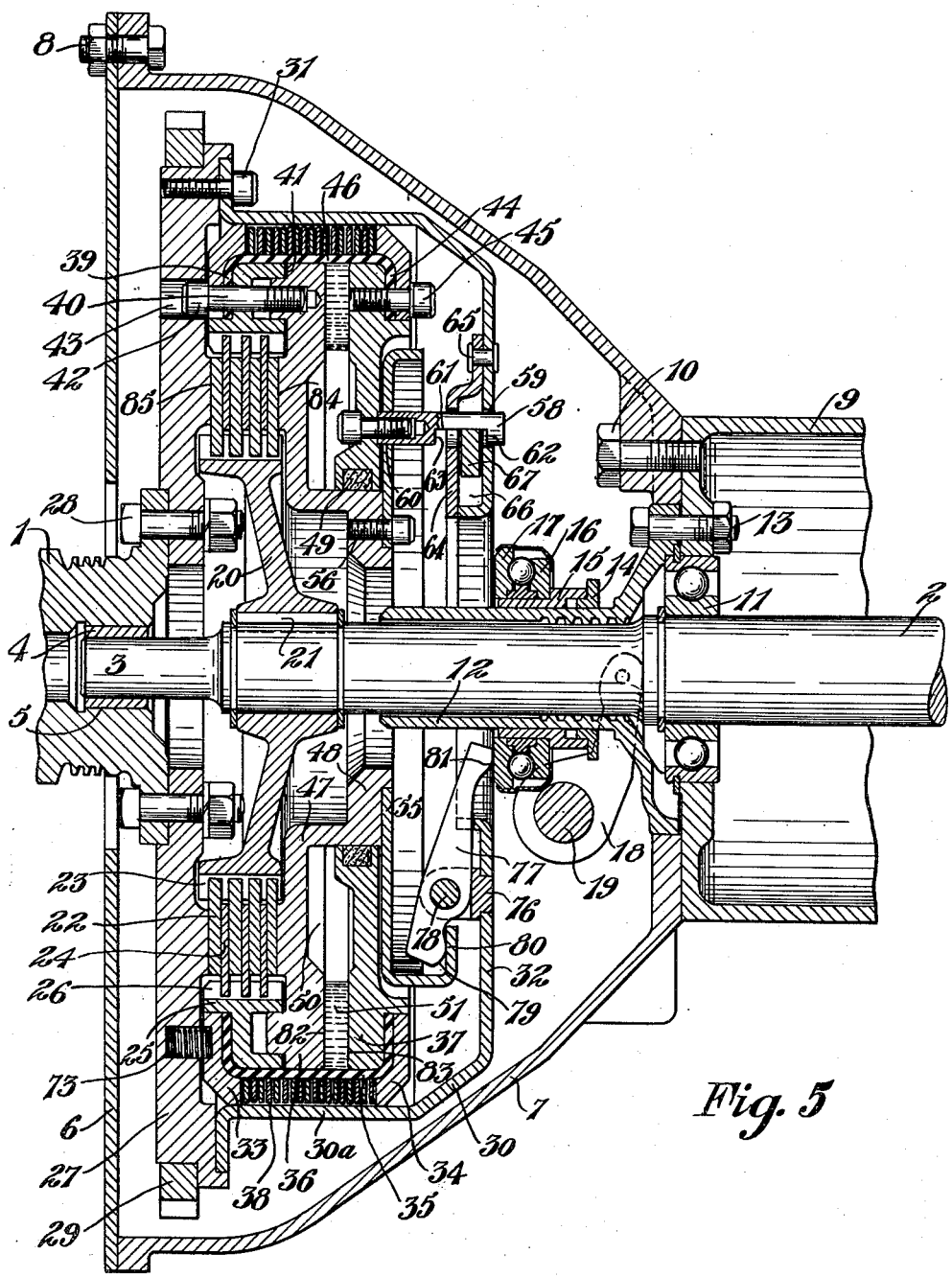
Fig. 5 is a view similar to Figs. 1 and 4 with the motor running at high speed and the cushion plate of the clutch actuating unit moved by the liquid pressure in the liquid actuating compartment to relieve excessive pressure.

The position of the clutch parts when the clutch has thus automatically engaged is shown in Fig. 4. At the time of such engagement and when the crank shaft 1 is rotating at up to say 900 to 1000 R. P. M., the cushion plate 37 remains stationary axially. As the engine speed is further increased above 900 to 1000 R. P. M., the pressure of mercury in compartment 50 continues to increase and overcomes the pressure of the relief springs 57. At such time, the relief springs 57 give way and the cushion plate 37 moves axially to the right. In so moving, the width of the mercury column in compartment 50 between surfaces 82 and 83 of the pressure plate 36 and cushion plate 37 increases, thus reducing the height or head of mercury and thereby reducing its effective pressure. In this manner, the relief springs 57 prevent excessive mercury pressure from building up in the mercury containing compartment 50. The position of the parts when the relief springs 57 have operated to relieve the mercury pressure is shown in Fig. 5 wherein the mercury body 51 has a greater width and a smaller height than shown in Fig. 4.

When the clutch is thus operating, the latch pins 58 also move to the right and release their hold on latch levers 67. However, due to the rotative speed, the latches 67 are maintained outward by centrifugal force, and do not change their latching position, and remain in the cutouts 61 so that when the latch pins 58 again move to the left when the engine speed is reduced resulting in a decrease in mercury pressure in compartment 50, the latch levers 67 again function to lock the latch pins 58 by engagement with latch shoulders 62.

When the vehicle is in motion and the motor is running at a speed above idling speed or above 900 to 1000 R. P. M., the clutch is automatically engaged and its parts are in the position illustrated in either Fig. 4 or Fig. 5. Under such conditions, the driver may desire to disengage the clutch. This is accomplished by depressing the usual clutch foot pedal which rotates shaft 19 in a counter-clockwise direction, pushing ring 14, sleeve 15 and throw-out bearing 16 to the left. Race member 17 of throw-out bearing 16 engages the inner ends 81 of the disengaging levers 77, rotating them in a counter-clockwise direction (Fig. 5) about pivots 78 and the outer ends 79 of levers 77, by engagement with ears 80 on plate 55 move the inner pressure plate 36 to the right, thus disengaging the clutch. If the clutch foot pedal is thereafter released while the motor is operating at any speed about 500 R. P. M., the clutch parts again assume automatic engaged position.

The operation of the usual clutch foot pedal described immediately above normally reacts against the pressure of the cushion springs 57 because the clutch is rotating at high speed and the mercury 51 in liquid containing compartment 50 is maintained thrown outward by centrifugal force. For these reasons, the latch pins 58 also may move to the right beyond the position shown in Fig. 5. The position of the parts when the clutch is thus manually disengaged is shown in Fig. 6. Under such circumstances, the latch pins 58 do not hold the latches 67; but as long as the motor is operating at a speed above the speed at which the latch levers 67 are thrown outward, the latch levers 67 stay in outward position to again engage and be engaged by the latch pins 58 when the clutch foot pedal is released.

If the speed of the motor is reduced below idling speed or if the motor is stopped while the clutch is disengaged by depression of the clutch foot pedal, centrifugal force no longer acts to throw the latch levers 67 outward, and if the foot pedal is released, the cushion springs 57 move all of the clutch parts to the left, thereby engaging the clutch as illustrated in Fig. 7.

Under these circumstances and with the car moving at above automatic clutch engaging speed, when the clutch is manually engaged the motor will be started or accelerated to such speed and the clutch parts will assume a condition of automatic engagement such as illustrated in either Fig. 4 or Fig. 5. On the other hand, if the car is stopped while the motor is running below idling speed or stopped and while the clutch is disengaged by depression of the clutch foot pedal, the clutch will be engaged in the position of Fig. 7 when the foot pedal is released and may be engaged or disengaged in the normal manner by operation of the foot pedal.

Moreover, if the car and motor are stopped or brought below automatic engagement of the clutch, and the foot pedal is then depressed, the throw-out bearing race member 17 moves disengaging levers 77 to move inner pressure plate 36 and cushion plate 37 and latch pins 58 to the right. Thus, latch levers 67 are disengaged and springs 69 move them inward from the position of Fig. 8 to the position of Fig. 9 so that when the foot pedal is released the clutch parts move to manually engaged position shown in Fig. 7. Thereafter, the clutch may be disengaged or engaged in the normal manner by operation of the foot pedal.

The clutch operation just described, indicating that the clutch may be manually engaged or disengaged when the car is stopped and the motor stopped, irrespective of whether or not the clutch is initially in condition for automatic or manual operation, is of greater benefit and advantage because it permits a motor to be started by pushing the car as when the battery has gone dead. Prior art automatic clutches normally do not provide for such manual operation of the clutch when the car and motor are stopped.

Likewise, the foregoing described operation of the clutch indicates that the clutch may be engaged while the car is running at above automatic engaging speed but while the motor is idling, following manual disengagement thereof, so as to use the motor as a brake for the car.

When the car is running at high speed and the foot pedal is depressed, the clutch is disengaged; and if the foot pedal is maintained depressed while the car "free wheels" or coasts to a stop and the motor is stopped, the clutch stays disengaged because the foot pedal is depressed but the latch levers 67 move inward when their rotative speed is reduced below critical speed. Thus, with the car at rest under such conditions, when the foot pedal is released, the clutch is in manual engaged position of Fig. 7 rather than in automatic disengaged position of Fig. 1. In order to start the car under such circumstances, it is necessary to depress the foot pedal to manually disengage the clutch and to then start the motor and bring the motor up to above automatic engaging speed at which time the latch levers 67 are thrown outward and again cooperate with latch pins 58 to provide for automatic clutch operation.

When the car is stopped and the motor stopped following automatic clutch operation, the clutch is in automatic disengaged position; and the latch pins 58 are held in the position shown in Fig. 1 by the latch levers 67 and likewise the latch levers 67 are held in the position shown by the latch pins 58. Under such circumstances, say when the battery has gone dead and it is desired to start the car by pushing the car, the foot pedal is depressed which moves latch pins 58 to the right. This releases the latches and latch springs 69 then move latch levers 67 inward. When the foot pedal is thereafter released, the clutch moves to manual engaged position of Fig. 7 by the action of the cushion springs 57; and thus the car may be pushed to start the motor. When the motor is then accelerated to above idling speed, say above 500 R. P. M., the clutch parts again assume positions for automatic operation.

If the car is coasting down a hill using the motor as a brake, the clutch stays engaged until the motor speed is reduced to below the critical engaging speed as the car slows down. At such time, the car "free wheels" and the motor may idle. If thereafter it is desired to use the motor as a brake at such low speeds, it is only necessary to depress the clutch foot pedal and to then release it, and the clutch thereafter functions as a normal clutch. In order to restore automatic clutch operation, it is only necessary to accelerate the motor above critical engaging speed. When the clutch thus becomes automatically engaged, if the car is running at slow speeds, the clutch parts thereafter immediately return to automatic disengaged position.

The gland sustaining rings 38 surround the cylindrical annular gland wall 46 and prevent the same from moving outward by the pressure of the mercury confined within compartment 50 by the gland 35 even though there is movement between the inner pressure plate 36 and cushion plate 37 away from one another accompanied by axial elongation of the cylindrical gland wall 46. The details of the construction and operation of the annular gland 35 and sustaining rings 38 shown but not claimed herein are illustrated, described and claimed in the copending Zimmermann application Serial No. 596,031, filed May 26, 1945, now abandoned.

Although the members 36 and 37 have been termed herein, respectively, a pressure plate and a cushion plate, the member 36 and the gland 35 and clamping rings 33 and 34 with which it is associated may be considered to be a cylinder having an expansible wall; and the cushion plate 37 may be considered as a piston operatively associated with the cylinder and connected with the expansible wall of the cylinder. In this manner, there may be relative movement between the piston and cylinder and between them and the clutch friction drive elements comprising the friction discs 22 and 24. This relative movement may occur as a result of pressure developed by the speed responsive means or mercury 51, or as a result of the operation of the foot pedal.

The fundamental aspects of the present invention involve two clutch members—the driven clutch member including spline hub 20 and driven friction discs 22, and the driving clutch member including fly-wheel 21, driving friction discs 24 and the parts of the clutch actuating unit including the inner pressure plate 36 and cushion plate 37; and one of the clutch members includes parts which are movable axially with respect to the other clutch member to provide for manual or automatic engagement or disengagement—the inner pressure plate 36 and the cushion plate 37. Relative or combined movement of these parts is controlled under three conditions; one in which one of the parts is held so that there can be no engagement of the clutch under any circumstances, even though pressure is acting between the parts; a second in which one of the parts is released so as to provide for clutch engagement under all circumstances; and a third in which the parts are associated so as to automatically engage and disengage the clutch depending upon the liquid pressure acting between the parts.

Accordingly, the present invention provides an improved automatic clutch construction which has special advantages in the automotive field; which operates automatically but has an auxiliary manual control such that it may be engaged or disengaged at any time at the option of the driver if used as a vehicle clutch; which utilizes liquid, preferably mercury, for automatic operation but provides for release of liquid pressure in the liquid containing compartment so that the pressure cannot exceed a certain predetermined amount; which may be operated in any of the manners described; which avoids the difficulties, solves the problems, eliminates the complications and satisfies the demand presented in the art; and which is durable, effective and reliable in use.

The embodiments of the present improvements illustrated and described herein are by way of example and the scope of the present invention is not limited to the exact details of construction of the various parts.

For instance, the liquid used is preferably mercury because of the many advantages accruing by use of this particular liquid, which has a very high specific gravity, is stable under normal operating conditions, and is unaffected by and does not affect the working parts which it contacts. However, other high specific gravity liquids may be used to operate clutches of the present invention.

Finally, in the foregoing description, certain terms have been used for brevity, clearness and understanding; but no unnecessary limitations are to be implied therefrom beyond the requirements of the prior art, because such words are utilized for descriptive purposes herein and not for the purpose of limitation, and are intended to be broadly construed.

Having now described the features of the invention, the construction, operation and use of a preferred embodiment thereof, of the advantageous, new and useful results attained by the improved automatic clutch construction, the new and useful devices, constructions, arrangements, combinations, sub-combinations, parts and elements, and reasonable mechanical equivalents thereof, obvious to those skilled in the art, are set forth in the appended claims.

We claim:

1. In an automatic clutch between rotatable driving and driven members including driving and driven friction element means; clutch friction drive element actuating means driven by the driving member including a pressure plate, a cushion plate, means connected to said plates and forming with said plates an expansible annular compartment between said plates, and a body of actuating liquid in said compartment; said plates being axially movable relative to each other and to the driving member, said liquid being thrown centrifugally outwardly in said compartment responsive to the speed of the driving member automatically to move said pressure plate toward said friction element means at driving member speeds above a predetermined speed to engage the clutch, means operative automatically to move said pressure plate away from said friction element means at driving member speeds below said predetermined speed to disengage the clutch, manual clutch operator means, means controlled by said manual operator for moving one of said plates toward the friction element means to engage the clutch when the driving member is not rotating above said predetermined speed, and means actuated by said manual operator for moving one of said plates away from said friction element means to disengage the clutch irrespective of the operative condition of said speed responsive automatic means.

2. In an automatic clutch between rotatable driving and driven members including driving and driven friction element means; clutch friction drive element actuating means driven by the driving member including a pressure plate, a cushion plate, means connected to said plates and forming with said plates an expansible annular compartment between said plates, and a body of actuating liquid in said compartment; said plates being axially movable relative to each other and to the driving member, said liquid being thrown centrifugally outwardly in said compartment responsive to the speed of the driving member automatically to move said pressure plate toward said friction element means at driving member speeds above a predetermined speed to engage the clutch, means operative automatically to move said pressure plate away from said friction element means at driving member speeds below said predetermined speed to disengage the clutch, yielding means normally urging said cushion plate toward said pressure plate constructed to permit movement of the cushion plate away from the pressure plate when the centrifugally developed pressure of liquid in said compartment between said plates reaches a predetermined amount, said yielding means being manually releasable to move one of said plates toward the friction element, means to engage the clutch when the driving member is not rotating above said predetermined speed, and manually controlled means for moving one of said plates away from said friction element means to disengage the clutch irrespective of the operative condition of said speed responsive automatic means.

3. In an automatic clutch between rotatable driving and driven members including driving and driven friction element means; clutch friction drive element actuating means driven by the driving member including a pressure plate, a cushion plate, means connected to said plates and forming with said plates an expansible annular compartment between said plates, and a body of actuating liquid in said compartment; said plates being axially movable relative to each other and to the driving member, said liquid being thrown centrifugally outwardly in said compartment responsive to the speed of the driving member automatically to move said pressure plate toward said friction element means at driving member speeds above a predetermined speed to engage the clutch, means operative automatically to move said pressure plate away from said friction element means at driving member speeds below said predetermined speed to disengage the clutch, a housing for the actuating means, latch means engageable between the housing and cushion plate normally restricting movement of the cushion plate toward said friction element means, manually controlled means for moving the pressure plate away from the friction element means to disengage the clutch irrespective of the operative condition of said speed responsive automatic means, and said manually controlled means also being constructed upon actuation to release said latch means when the driving member is stopped to manually engage the clutch.

4. In an automatic mercury actuated centrifugal clutch between driving and driven members, relatively movable piston and cylinder member means forming a pressure chamber therebetween, a body of mercury in said chamber, one of said piston and cylinder members being movable by mercury pressure in said chamber when the mercury is thrown outward by centrifugal force at driving member speeds above a predetermined speed automatically to establish driving engagement between said driving and driven members, manual control means for moving said piston and cylinder members to disengage the clutch irrespective of the operative condition of said mercury, and means released by said control means upon actuation of the latter for moving said piston and cylinder members to engage the clutch when the driving member is not rotating above said predetermined speed.

5. In a mercury actuated centrifugal clutch, a driven member, a driving member including a cylinder member having an expansible wall, a piston member movable with respect to said cylinder member connected with said expansible wall; movable friction element means associated with the driving, driven, piston and cylinder members; a body of mercury confined between said piston and cylinder members operative by the action of centrifugal force when the speed of rotation of the driving member is above a predetermined speed to produce relative movement between said piston and cylinder members for establishing driving engagement between said friction element means, means for restraining relative movement between said piston and cylinder members at speeds below said predetermined speed, means for moving said cylinder member away from the friction element means to disengage the clutch irrespective of the operative condition of said mercury, and said restraining means including means releasable to move the piston and cylinder members toward said friction element means to engage the clutch when the driving member is stopped.

6. In a mercury actuated centrifugal clutch, a driven member, a driving member including a cylinder member having an expansible wall, a piston member movable with respect to said cylinder member connected with said expansible wall; movable friction element means associated with the driving, driven, piston and cylinder members; a body of mercury confined between said piston and cylinder members operative by the action of centrifugal force when the speed of rotation of the driving member is above a predetermined speed to produce relative movement between said piston and cylinder members for establishing driving engagement between said friction element means, means for restraining movement of the cylinder member toward said friction element means when the driving member is rotating below said predetermined speed, means for restraining movement of said piston member away from said cylinder member when the driving member is rotating below another higher predetermined speed, means for moving said cylinder member away from the friction element means to disengage the clutch irrespective of the operative condition of said mercury, and said last-mentioned restraining means being manually releasable to move the piston and cylinder members toward said friction element means to engage the clutch when the driving member is stopped.

7. In an automatic clutch between rotatable driving and driven members including driving and driven friction element means; clutch friction drive element actuating means driven by the driving member including a pressure plate having an inner annular hub flange, a cushion plate ring axially slidable on said flange, a cylindrical rubber wall connected with the outer ends of said plates and forming with said plates and flange an axially expansible annular compartment between said plates, sustaining rings surrounding said rubber wall preventing radial expansion thereof, and a body of actuating liquid in said compartment; said plates being axially movable relative to each other and to the driving member, said liquid being thrown centrifugally outwardly in said compartment responsive to the speed of the driving member automatically to move said pressure plate toward said friction element means at driving member speeds above a predetermined speed to engage the clutch; a housing for the actuating means, spring means reacting between said housing and cushion plate urging said cushion plate toward said pressure plate and yielding to excess centrifugally developed pressure of said liquid in said compartment to permit movement of said cushion plate away from said pressure plate, latch means normally limiting movement of the cushion plate toward the pressure plate, and manually actuated levers mounted on said housing operatively engaged with said pressure plate flange to move the pressure plate away from the friction element means and toward the cushion plate to disengage the clutch irrespective of the operative condition of the speed responsive means.

ARTHUR M. WICKWIRE.
HANS J. ZIMMERMANN.

REFERENCES CITED

The following references are of record in the file of this patent:

UNITED STATES PATENTS

| Number | Name | Date |
|---|---|---|
| Re. 20,508 | Vail | Sept. 14, 1937 |
| 1,618,643 | Dickson | Feb. 22, 1927 |
| 1,814,566 | Lombard | July 14, 1931 |
| 2,087,380 | Kress | July 20, 1937 |
| 2,210,416 | Keep et al. | Aug. 6, 1940 |
| 2,239,568 | Newton | Apr. 22, 1941 |
| 2,285,652 | Flickinger | June 9, 1942 |
| 2,368,299 | Hayter | Jan. 30, 1945 |
| 2,408,327 | McLean | Sept. 24, 1946 |
| 2,452,008 | Wickwire et al. | Oct. 19, 1948 |

FOREIGN PATENTS

| Number | Country | Date |
|---|---|---|
| 414,662 | Great Britain | Aug. 7, 1934 |
| 519,226 | Great Britain | Mar. 20, 1940 |